United States Patent [19]

Tolliver et al.

[11] Patent Number: 5,069,964
[45] Date of Patent: Dec. 3, 1991

[54] FLEXIBLE, SUBSTRATE-INSULAR RETROREFLECTIVE SHEETING

[75] Inventors: Howard R. Tolliver; Terry R. Bailey, both of Woodbury; David L. Bergeson, Mendota Heights, all of Minn.

[73] Assignee: Minnesota Mining and Manufacturing Company, St. Paul, Minn.

[21] Appl. No.: 659,530

[22] Filed: Feb. 22, 1991

Related U.S. Application Data

[63] Continuation of Ser. No. 356,079, May 23, 1989, abandoned.

[51] Int. Cl.[5] ...................... G02B 5/122; G02B 5/128
[52] U.S. Cl. .................................. 428/325; 428/421; 428/423.7; 428/425.8; 428/461; 428/483; 428/500; 359/529; 359/536; 359/541
[58] Field of Search ............ 428/325, 406, 421, 423.7, 428/425.8, 461, 483, 913; 350/98, 102, 105; 40/442; 116/63 C

[56] References Cited

U.S. PATENT DOCUMENTS

| | | | |
|---|---|---|---|
| 2,407,680 | 9/1946 | Palmquist et al. | 88/82 |
| 3,190,178 | 6/1965 | McKenzie | 88/82 |
| 3,700,305 | 10/1972 | Bingham | 350/105 |
| 3,922,065 | 11/1975 | Schultz | 350/103 |
| 3,924,929 | 12/1975 | Holmen et al. | 350/103 |
| 4,025,159 | 6/1977 | McGrath | 350/105 |
| 4,377,988 | 3/1983 | Tung et al. | 119/106 |
| 4,555,161 | 11/1985 | Rowland | 350/103 |
| 4,605,592 | 8/1986 | Paquette et al. | 428/334 |
| 4,637,950 | 1/1987 | Bergeson et al. | 428/168 |
| 4,663,213 | 5/1987 | Bailey et al. | 428/204 |
| 4,725,494 | 2/1988 | Belisle et al. | 428/325 |

FOREIGN PATENT DOCUMENTS 0175031  3/1986  European Pat. Off. .
1476447  6/1977  United Kingdom .

Primary Examiner—George F. Lesmes
Assistant Examiner—Christopher Brown
Attorney, Agent, or Firm—Gary L. Griswold; Walter N. Kirn; Robert H. Jordan

[57] ABSTRACT

A retroreflective sheeting comprising a substantially transparent face member, an encapsulating member having a front and a back side, the front side of the encapsulating member being sealed by a network of interconnecting bonds to the face member, and retroreflective elements disposed between the face member and the encapsulating member in substantially a monolayer with an air-interface. The encapsulating member comprises a plasticizer-resistant barrier layer which prevents migration of plasticizer therethrough, thereby protecting the aforementioned elements of the sheeting therefrom.

31 Claims, 2 Drawing Sheets

FLEXIBLE, SUBSTRATE-INSULAR RETROREFLECTIVE SHEETING

This is a continuation of application Ser. No. 07/356,079 filed May 23, 1989, now abandoned.

FIELD OF INVENTION

The present invention relates to cellular, or encapsulated-element retroreflective sheeting such as is disclosed in U.S. Pat. Nos. 3,190,178 (McKenzie) and 4,025,159 (McGrath) and elsewhere, and particularly relates to a substrate-insular form thereof, i.e., a sheeting which is resistant to degradation by agents in the substrate to which the sheeting is applied.

BACKGROUND

The earliest retroreflective sheeting had an exposed-lens construction. In such sheeting, retroreflection of light was inhibited when the lenticular surfaces of the lenses were covered with water. This problem was answered by enclosed-lens retroreflective sheeting, such as is taught in U.S. Pat. No. 2,407,680 (Palmquist et al.), wherein the lenses, typically glass microspheres with specular reflective layers disposed behind the rear surfaces thereof, were totally embedded within a sheeting that had a flat transparent top film. This allowed incident light rays to be focused onto the specularly reflective layer irrespective of whether the front of the sheet was wet or dry. U.S. Pat. No. 3,190,178 (McKenzie) solved the same problem in a different way. That patent discloses a cellular retroreflective sheeting that is formed from (1) a base sheet comprising retroreflective elements partially embedded in a binder layer and (2) a cover sheet. The cover sheet is sealed to the base sheet along a network of interconnecting bonds to form hermetically sealed cells with protected retroreflective elements having an air-interface therein An advance upon this technique is disclosed in U.S. Pat. No. 4,025,159 (McGrath) wherein the binder material is taught to be thermoformable material that is cured in situ after being thermoformed, thereby achieving more reliable adhesion of the binder material to the cover sheet. Two common embodiments of encapsulated-element sheetings are (1) microsphere-based sheetings which typically comprise a monolayer of microspheres partially embedded in layer of binder material which is thermoformed in a grid pattern or network of intersecting bonds into contact with a substantially transparent cover film in front thereof and (2) prismatic or cube-corner retroreflective sheetings which typically comprise internally reflecting elements located on the back side of a face sheet that has a flat front face and a sealing layer located behind the elements which is sealed to the face sheet in a network of intersecting bonds.

In order for encapsulated-element retroreflective sheetings to provide desired performance it is important the cover film remain firmly bonded to the remaining portions of the sheeting in order to maintain the desired encapsulated, i.e., sealed, structure. Further, the components of the sheeting should be sufficiently durable and remain stable so as to maintain (1) desired arrangement to provide the optical functionality necessary for retroreflection, e.g., the desired air-interface, and (2) structural integrity. Many steps can be taken to achieve such durability. For instance, U.S. Pat. No. 4,637,950 (Bergeson et al.) discloses a cover film for encapsulated-element retroreflective sheetings which provides increased resistance to delamination. The aforementioned U.S. Pat. No. 4,025,159 discloses another technique for achieving increased delamination resistance in encapsulated-element retroreflective sheetings by strengthening the bond of the cover or sealing film thereto.

Because of the high visibility which retroreflective products such as sheetings can provide, they are commonly applied to many items for purposes of communication, e.g., road signs bearing information for travelers, and safety, e.g., traffic cones, clothing, life rafts, etc. In some instances, such applications may expose the sheetings to conditions or agents which may cause degradation of the sheeting, thereby impairing or even destroying, the retroreflective performance of the sheeting. For instance, sheetings used in outdoor applications should be resistant to exposure to ultraviolet radiation and moisture.

One common and demanding application of retroreflective sheetings is on construction zone markers and traffic delineators, e.g., traffic cones, barriers, etc. Such articles are typically subject to rough treatment and exposure to varied, often extreme, environmental conditions. In such applications, the articles or substrates to which the sheetings are mounted may present another risk to the retroreflective performance of the sheeting. Traffic cones, for instance, are typically made so as to be very flexible. Commonly they may be made of such materials as polyvinyl chloride which is highly plasticized in order to achieve high flexibility and impact resistance. Furthermore, in order to provide high conspicuity, traffic cones may be colored, such as with pigments or dyes, with very bright, conspicuous colors, e.g., blaze or fluorescent orange.

In order to be used on such articles, retroreflective sheetings should be impact resistant and flexible; accordingly, cover films, binder materials, etc., are typically selected to exhibit the desired properties such as abrasion resistance, flexibility, and resistance to degradation by exposure to ultraviolet radiation ("UV"). Another risk, however, is that agents within the substrate article such as plasticizers, will tend to migrate from the substrate into the sheeting, commonly also causing pigments or other agents in the substrate to penetrate the sheeting as well.

In many instances, penetration of plasticizer into a retroreflective sheeting can result in degradation of the sheeting, thereby reducing the useful life of the sheeting. For instance, the bond between the cover film and other elements of the sheeting may be weakened such that the cover film may tend to delaminate, thereby rendering the sheeting subject to impairment by moisture deposition on the surfaces of the microspheres or prismatic elements so as to destroy the desired air-interface. The plasticizer may penetrate or migrate into the sheeting and form a layer on the optical surfaces of the retroreflective elements which are supposed to have an air-interface (i.e., the front surfaces of microspheres or the surface of prismatic elements depending upon the type of sheeting), thereby impairing retroreflection just as moisture can on exposed-lens constructions. In some instances, one or more elements of the sheeting, e.g., the binder layer or prismatic elements, may be deleteriously affected such that the structural integrity of the sheeting is lost and retroreflective performance is substantially impaired or even lost, e.g., the cover film may wrinkle, or the retroreflective elements may distort in shape or orientation. Furthermore, migrating plasticizer may cause unsightly discoloration of some portion of the sheeting, e.g., the seal legs of which a white or other specified color is often desired. In many instances, when the plasticizer migrates into the sheeting it may tend to carry along other agents, e.g., colorants in the substrate such as pigments and dyes, which further impair the performance or appearance of the sheeting.

SUMMARY OF INVENTION

The present invention provides encapsulated-element retroreflective sheetings that can have good flexibility, and high tensile strength, and which are resistant to degradation by such deleterious agents as plasticizers and colorants in a substrate to which the sheetings may be applied.

In brief summary, the novel retroreflective sheetings provided by the present invention comprise: (a) a substantially transparent face member typically having a substantially flat front surface; (b) an encapsulating member having a front and a back side, the front side of the encapsulating member being disposed in spaced relation from, and sealed by a network of intersecting bonds to, the face member; and (c) retroreflective elements disposed between the face member and encapsulating member in such a manner as to retroreflect light incident to the front surface of face member. The encapsulating member in part comprises a "plasticizer-resistant" barrier layer By "plasticizer-resistant" it is meant that the barrier layer substantially will not be degraded by exposure to plasticizers, e.g., dioctyl terephthalate and dioctyl phthalate, and will substantially prevent migration of plasticizers therethrough. The retroreflective elements are typically arranged in substantially a monolayer and have an air-interface. In some embodiments the retroreflective elements will be microspheres having reflectors disposed behind the rear surfaces thereof wherein the rear portions of the microspheres are partially embedded in, and the front portions of the microspheres protrude from, the front side of the encapsulating member which functions in part as a binder layer. In some embodiments the retroreflective elements will be prismatic reflective elements, i.e., cube-corner reflectors, located on the inside surface of the face member. Retroreflective sheetings of the invention differ from previously known encapsulated-element sheetings in that the encapsulating member comprises a barrier layer which is plasticizer-resistant. Typically, sheetings of the invention will be sufficiently flexible to be wound around a ⅛ (0.125) inch (3.2 millimeters) mandrel at a temperature of about 32° F. (0° C.) without cracking. Preferably, the sheeting will be sufficiently flexible to be wound around a ⅛ inch mandrel at a temperature of about −10° F. (−23° C.). In the case of embodiments of retroreflective sheetings being made for use on traffic control barricades and devices, e.g., traffic cones, sheetings will typically have an impact-resistance of at least 40 inch-pounds at 32° F. (0° C.), and will preferably have at least sufficient impact resistance to withstand a 100 inch-pound impact at a temperature of about 32° F. (0° C.) without breaking. More preferably, the sheeting will have sufficient impact resistance to withstand a 160 inch-pound impact at a temperature of about −10° F. (−23° C.). An inch-pound is a measure of the magnitude of an impact expressed as the multiple of the specified weight and the vertical distance it is dropped to impact the sheeting mounted on an aluminum test panel.

Retroreflective sheetings of the invention can exhibit many advantageous properties and characteristics. For instance, the barrier layer can impart increased tensile strength, tear resistance, and integrity to the sheeting, permitting, for example, such sheetings to be sewn to substrates. Such increased properties can also permit the sheeting to be removed from substrates more conveniently. Importantly, the barrier layer acts as a protective barrier, thereby protecting the sheeting from penetration into its back side of deleterious agents such as plasticizers or colorants which may tend to degrade the sheeting or its retroreflective properties. Thus, sheetings of the invention can be applied to such highly plasticized articles as traffic cones and still retain their retroreflective performance over substantial periods of use because the structural integrity of the sheeting including the critical air-interfaces of the retroreflective elements is maintained. Furthermore, sheetings of the invention will typically resist discoloration due to migration of agents from substrates into the sheeting, thereby tending to retain desired daytime appearance, e.g., white coloration.

BRIEF DESCRIPTION OF DRAWING

The invention will be further explained with reference to the drawing, wherein.

These figures, which are idealized, are not to scale and are intended to be merely illustrative and non limiting.

DETAILED DESCRIPTION OF INVENTION

Figure 1:
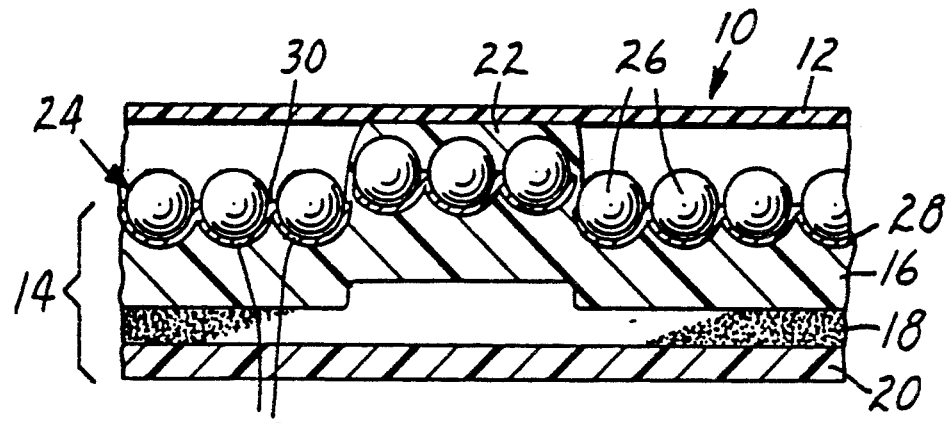
FIG. 1 is a cross-sectional illustration of a completed portion of one microsphere-based embodiment of retroreflective sheeting of the invention.

FIG. 1 is a cross-sectional illustration of a completed portion 10 of one microsphere-based embodiment of retroreflective sheeting of the invention. Sheeting 10 comprises in part face member 12, (sometimes referred to as a cover film or cover sheet), and encapsulating member 14 which comprises binder layer 16, intermediate adhesive 18, and barrier layer 20. Face member 12 and encapsulating member 14 are disposed in spaced relation and sealed by a network of intersecting bonds 22. Sheeting 10 also comprises retroreflective elements 24 disposed between face member 12 and encapsulating member 14. Retroreflective elements 24 are arranged in substantially a monolayer and have an air-interface, i.e., the front surfaces thereof are exposed. In this embodiment, retroreflective elements 24 are partially embedded in binder layer 16 of encapsulating member 14 and partially protrude from front surface 30 thereof, and comprise microspheres 26 having reflectors 28 disposed behind the rear surfaces thereof.

Figure 2:
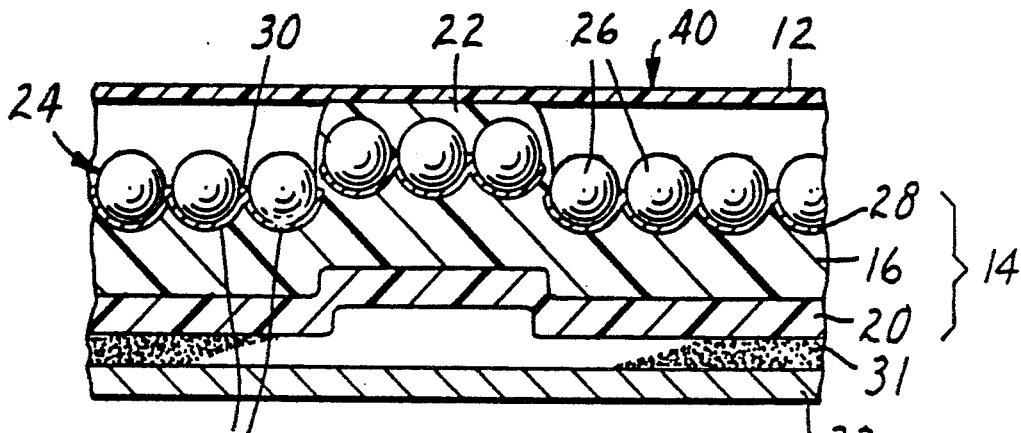
FIG. 2 is a cross-sectional illustration of a completed portion of another microsphere-based embodiment of retroreflective sheeting of the invention.

FIG. 2 is a cross-sectional illustration of a completed portion 40 of another microsphere-based embodiment of retroreflective sheeting of the invention wherein barrier layer 20 is adhered directly to the back side of binder layer 16 of encapsulating member 14, i.e., is "self-adhered" thereto without use of an intermediate adhesive. As illustrated in FIG. 2, retroreflective sheetings of the invention may further comprise mounting adhesive 31 on the back side of encapsulating member 14 to be used to affix sheeting 40 to a substrate (not shown). Typically mounting adhesive 31 will be covered by removable protective liner 32 during handling.

Transparent microspheres having reflectors disposed behind the rear surfaces thereof are a commonly used kind of retroreflective element. Such retroreflective elements typically provide satisfactory levels of retroreflective brightness over a wide range of incidence angles, i.e., the angles at which the light strikes the sheeting.

If microspheres are used, the microspheres are preferably substantially spherical in shape in order to provide the most uniform and efficient retroreflection. Furthermore, the microspheres are preferably substantially transparent so as to minimize the amount of light absorbed by the microspheres and thereby optimize the amount of light which is retroreflected by sheetings of the invention. The microspheres are typically substantially colorless, but, may be colored to produce special effects if desired. Microspheres used herein may be made from glass or synthetic resin having the optical properties and physical characteristics taught herein. Glass microspheres are typically preferred because in general they cost less and exhibit superior durability to microspheres made of synthetic resins.

Microspheres used in sheetings of the present invention will typically have an average diameter of between about 40 and about 200 microns. Microspheres having average diameters outside this range may be used, however, microspheres which are substantially smaller than this range may tend to provide lower levels of retroreflection because of diffraction effects, whereas microspheres which are substantially larger than this range yield undesirably thick retroreflective sheetings as greater quantities of binder material are needed to hold the microspheres in place. Increased thickness may tend to reduce the flexibility of the resultant sheeting. Microspheres used in the present invention will typically have a refractive index of between about 1.70 and about 2.0, the range typically considered to be useful in microsphere-based retroreflective products where, as here, the front surfaces of the microspheres are air-incident.

As mentioned above, microsphere type retroreflective elements of retroreflective sheetings of the invention have reflectors on the rear surfaces thereof. Illustrative examples of materials used as reflectors include vacuum-deposited or vapor-coated metal coatings, such as aluminum or silver; chemically-deposited metal coatings, such as silver; metal-coated plastic films; metal flakes; such as aluminum or silver; dielectric coatings; and nacreous or pearlescent pigment particles. Aluminum or silver coatings are typically preferred, because they tend to provide the highest retroreflective brightness. The daytime whiteness of sheetings made using silver coatings is typically lighter and more preferred than that of aluminum coatings, but overall an aluminum vapor coat is normally more preferred, because silver reflective coatings typically tend to suffer more severe degradation in outdoor exposure than do aluminum coatings U.S Pat. No. 3,700,305 (Bingham) discloses dielectric mirrors or coatings that may be used in retroreflective articles of the invention.

The retroreflective elements are typically closely or densely packed to provide maximum retroreflective brightness.

Referring again to FIG. 1, retroreflective elements 24 are partially embedded in and protrude from binder layer 16 of encapsulating member 14. Typically, binder layer 16 comprises a binder material that is thermoformable into adherent contact with face member 12. Binder materials useful in forming thermoformed bonds are typically room-temperature solids that will soften to a formable state when heated to temperatures between about 50° and 250° C. Binder materials which soften at temperatures in the low end of the indicated range may tend to soften too easily for the resultant sheeting to remain stable in a typical environment, e.g., on a paved construction zone during summer months, whereas binder materials which soften at temperatures in the high end of the indicated range typically require more expensive processing during fabrication of sheetings therewith. Under pressure of an embossing platen the binder material flows sufficiently to wet face member 12, typically flooding the microspheres in the area pressed, but it does not flow significantly into areas that are not pressed, thereby leaving a hermetically sealed cell or pocket of microspheres having an air-interface, i.e., their front surfaces are exposed. Further, once heat and pressure are removed, the binder material should hold its thermoformed shape.

If the binder is to then be cured, e.g., by electron-beam radiation, it will include one or more reactive ingredients, e.g., ingredients that are activated in the presence of electron-beam radiation (as by formation of free radicals through loss or transfer of hydrogen atoms or decomposition of initiator molecules). The aforementioned U.S. Pat. No. 4,025,159 discloses the curing of thermoformed binder material to improve the delamination resistance of encapsulated-element sheeting. In some instances, curable binder materials may tend to become less flexible or even brittle, to an undesirable degree, when cured. Accordingly, selection of the binder material is dependent in part upon the properties, e.g., flexibility, desired of the resultant sheeting.

Binder materials used in sheetings of the invention are typically flexible, and if they are to be thermoformed into contact with a face member, are, at least initially, substantially thermoplastic. Some illustrative examples of binder materials useful in sheetings of the invention include urethanes, vinyls, olefins, etc. Binder materials may be extruded, solvent cast, or formed by other means.

In addition to the binder material, binder layers of encapsulating members used herein may typically contain one or more colorants or coloring agents, e.g., pigments and/or dyes, to impart desired appearance to the resultant sheeting. The network of interconnecting bonds, sometimes referred to as the "seal legs", will be readily visible from the front of the sheeting, thus the binder material is typically colored. For instance, as is known in the art, the binder may contain titanium dioxide to impart a white color thereto. Provision of such color may be important to improve the conspicuity of the sheeting and substrate to which it is applied and may also be used to enhance the contrast between the subject retroreflective sheeting and surrounding materials such as to improve the legibility of an informational legend. Cap Y is a measure of overall whiteness of daytime appearance of a sheeting which may be determined in accordance with ASTM E97-77. In some embodiments of the invention, sheetings may be made having a Cap Y of 27 or more. A high whiteness appearance, e.g., a high Cap Y, is required by some standards for retroreflective products.

In addition to or instead of coloring agents, binders of the invention may contain one or more other property-enhancing agents; illustrative examples being protective agents or stabilizers such as UV absorbers, free radical inhibitors, weathering agents, antioxidants, etc., adhesion promoters to improve the adhesion to reflective elements partially embedded therein or to other elements of the sheeting such as the barrier layer or the face member, and processing aids such as viscosity controlling agents which can be used to facilitate the fabrication process.

Binder layer 16 of encapsulating member 14 of a microsphere-based type sheeting of the invention as illustrated in FIGS. 1 and 2 is generally at least about as thick as the average diameter of the microspheres employed, and may approach two or three times the average diameter of the microspheres employed.

Although displacement of binder material from a binder layer of an encapsulating member is the preferred way to form bonds, because of the fewer steps in such an operation, minimization of interfaces within the sheeting, and controlled shaping of the bonds into neat narrow lines, the bonding material can also be introduced into the sheeting separately from the encapsulating member, as a separate sheet preformed in an open-mesh pattern, for example. Such a separately introduced bonding material is then adhered between the face member and the encapsulating member, e.g., typically by laminating it between the two members with heat and pressure.

Barrier layers used herein should preferably be substantially impermeable to migration of plasticizers and other deleterious agents in the substrate to which the sheeting is to be applied. Illustrative examples of such agents include monomeric and polymeric plasticizers and coloring agents which are contained in the substrate or which penetrate and migrate through the substrate. In the case of reboundable devices such as traffic cones which are made of polyvinyl chloride, commonly encountered plasticizers include such monomeric plasticizers as dioctyl phthalate and dioctyl terephthalate.

The barrier layer is preferably essentially continuous over the entire encapsulating member, or in the case of sheetings which are mounted on the traffic cone, the barrier layer is preferably essentially continuous over at least that portion of the encapsulating member which is coextensive with the substrate.

In addition, the barrier layer is typically preferably somewhat flexible, such as to permit the resultant sheeting to wound upon itself into roll form for storage. Additionally, being flexible permits the sheeting to be applied to non-planar substrates, e.g., traffic cones, etc. The barrier layer is preferably sufficiently impact resistant and flexible for the resultant sheeting to withstand distortion and rough handling during use. As with the face member, the barrier layer should not detrimentally lose its desired properties under probable temperatures of use.

Illustrative examples of useful plasticizer resistant barrier materials include, but are not limited to, the following: polyester, nylon, polyvinylidene dichloride, e.g., SARAN from Dow Chemical Company, ethylene vinyl alcohol, and polyvinyl fluoride. A preferred barrier material is biaxially-oriented, heat-set polyester which typically exhibits high strength, durability, weather resistance, and impermeability to plasticizers, and is typically substantially dimensionally stable.

Extruded films of such materials are typically preferred over solvent cast films thereof, as it has been observed that extruded films tend to act as more effective barriers to commonly used plasticizers. It is believed that many solvent cast films may have pin holes or other structural features left by evaporating solvent which permit plasticizers to penetrate through the barrier. Extruded films, it is also believed, typically provide more impermeable barrier layers. In some instances, high molecular weight extruded films may tend to provide tougher films which are more likely to retain high degrees of impermeability than are lower molecular weight films of otherwise similar composition. Accordingly, high molecular weight films may be preferred as barrier layers herein.

The barrier layer may be adhered to binder layer 16 with intermediate adhesive 18, as shown in FIG. 1, or it may be self-adhered thereto, as shown in FIG. 2. Selection of intermediate adhesive 18 is dependent in part upon the properties of barrier layer 20 and the element of encapsulating member 14 to which it is adhered, e.g., binder layer 16 as shown. Such an adhesive should be chosen to provide good adhesion to prevent delamination failure of the resultant sheeting. Illustrative examples of some adhesives which are useful as intermediate adhesives herein include pressure-sensitive adhesives, heat-activated adhesives, etc.

In embodiments such as illustrated in FIG. 2 wherein barrier layer 20 is directly adhered to binder layer 16, the barrier layer and binder layer should be selected to exhibit desired compatibility as needed to achieve the desired bond therebetween. Illustrative examples of useful combinations include polyester barrier layers which can be self-adhered to many types of binder layers such as urethanes and olefins, typically with some form of priming, e.g., with surface treatment such as corona treatment, plasma discharge, or sputter etching, or by with an additional layer of primer such polymeric primer. In some instances, the adhesion between the barrier layer and the binder material can be improved by extruding the binder material onto the barrier layer. The binder material preferably does not contain deleterious quantities of any agents which would interfere with the desired bond. For instance, certain release agents which are used to facilitate transfer of aluminum vapor-coated microspheres from a carrier while leaving the aluminum which was deposited between the microspheres on the carrier may interfere with adhesion of the binder material to the barrier layer if used in high amounts. Satisfactory binder material formulations and binder material and barrier layer combinations may be readily determined by trial and error.

Barrier layers used herein will typically be between about 0.25 and about 10 mils (6 and 250 microns) thick. Barrier layers having thicknesses outside this range may be used, however, barrier layers which are substantially thinner than this range may tend to be too easily damaged during fabrication of the sheeting so as to fail to provide the desired plasticizer barrier whereas barrier layers which are substantially thicker than the indicated range may tend to render the resultant sheeting undesirably stiff and resistant to being readily conformed to a substrate. Also, if the barrier layer is to be used as a sealing film during formation of the aforementioned network of interconnecting bonds as described below, it should not be so thick as to interfere with application of embossing pressure to thermoform the binder material into contact with the face member. For instance, a barrier layer made of polyester film which is to be used as the sealing film will typically be between about 0.25 and 1 mil (6 and 25 microns) thick to facilitate formation of the network of bonds. The optimum thickness of the barrier layer is determined in part by the properties desired of the resultant sheeting. For instance, if the sheeting is to be sewn to a substrate, a polyester barrier layer having a thickness of between about 2 and 4 mils (50 and 100 microns) is typically preferred to provide desired tear resistance. In another embodiment, the sheeting may be used as a roll up sign, e.g., carrier in police vehicles or utility service vehicles, which is stored in rolled or folded fashion and then unfurled for use such as at an accident scene or near a construction zone.

In addition to providing a barrier to penetration by agents within a substrate, another advantage of some embodiments of the invention is that the barrier layer may be used as a sealing film on the binder material during thermoforming of the interconnecting bonds. In such instances, the barrier layer may be applied to the back side of the binder layer prior to application of embossing pressure, to form interconnecting bonds, e.g., by passing between nip rollers If the barrier layer is to be used in this manner, it should be sufficiently conformable to deform in accordance with the embossing pattern such that the binder material will be thermoformed into contact with the face member. This is shown in FIG. 2 wherein barrier layer 20 is deformed in the area adjacent bond 22. If the barrier layer is to be used as the sealing film, in addition to being deformable, it should be able to withstand the heat and pressure used during formation of the bonds without attenuating, i.e., becoming so thin, so as to cease to be an effective barrier. Polyethylene terephthalate barrier layers, which can commonly withstand temperatures up to about 200° C. without degradation, are typically useful as sealing films.

Another example of barrier layers includes metal films such as of aluminum. Such films may be incorporated into sheetings of the invention as preformed foils or may be applied as vapor coats during formation of the sheeting. Such barrier layers may be substantially thinner than the polymeric embodiments discussed above and still provide desired resistance to plasticizer penetration, however, sheeting embodiments comprising such barrier layers may typically further comprise other elements to impart additional strength to the sheeting depending in part upon the intended application for which the sheeting is being prepared. Furthermore, very thin metal layers, e.g., less than about 1 micron in thickness, may tend to contain pinholes or other flaws which reduce the plasticizer impermeability thereof or may be likely to crack or form holes when stretched such as where the resultant sheeting is flexed during use. The metal barrier should be made up of a substantially ductile metal which can be formed so as to enable the resultant sheeting to be flexed or deformed during use while substantially retaining its plasticizer-resistance. Some advantages of metal barrier layers include that they will typically achieve strong adhesion to adjacent polymeric layers, particularly those having high polar functionality content, and they are typically very stable over a wide temperature range whereas certain polymeric barrier layers may not achieve strong bonds with adjacent layers as easily and may tend to change properties, e.g., flexibility, more substantially as ambient temperature changes.

Typically, if metal barrier layers are used in sheetings of the invention, the encapsulating member will also comprise a layer which can act as a mask located between the barrier layer and the face member. Such layer typically contains a coloring agent, e.g., titanium dioxide, to impart desired color, e.g., white, to the sheeting.

Face member 12 of microsphere-based sheetings of the invention is typically a substantially transparent film or sheet which is flexible, impact resistant, and weatherable. Many monolayer and multilayer face members, sometimes referred to as cover films, for encapsulated-lens type retroreflective sheetings are known. Illustrative examples being polyolefins, vinyls, polyesters, urethanes, fluoropolymers, face members of sheetings of the invention will typically comprise one or more performance-enhancing agents such as protective agents, e.g., UV absorbers, weathering agents, etc., coloring agents, e.g., dyes, and adhesion promoters. Typically comprising or even consisting essentially of polymeric materials, multilayer face members may be used to optimize overall member properties, illustrative examples including hard, highly abrasion-resistant outer layers and adhesion promoting inner layers.

A common application or use for sheetings of the invention is applied to traffic markers such as traffic cones. In such environments, the sheetings are subject to impact and rough handling. Accordingly, the face members of sheetings of the invention should be able to withstand such conditions for a desired service period. Face members should be impact resistant as mentioned above and are preferably also abrasion resistant. The face members should also retain these properties over a wide range of ambient temperatures under which the sheetings may be used, i.e., preferably from about $-40°$ C. to about 80° C.

Typically an adhesive, referred to herein as a mounting adhesive, will be applied to the back side of the encapsulating member of a sheeting of the invention to bond same to a substrate. Illustrative examples of such adhesives include heat-activated adhesives, pressure-sensitive adhesives, etc. Selection of such adhesives is dependent in part upon the characteristics of the back of the encapsulating member and the substrate to which the sheeting is to be applied. For instance, sheetings which are to be applied to the back side of a traffic cone will typically be made with a "plasticizer-tolerant" adhesive, i.e., an adhesive which will provide sufficient bond strength and cohesive strength even when contacted or penetrated by plasticizer. Illustrative examples of suitable mounting adhesives include adhesives based on nitrile butadiene rubber including both hydrogenated and non-hydrogenated rubbers with varying acrylonitrile content, e.g., from about 10 to about 45 weight percent, and terpolymers such as acrylonitrile/butadiene/isoprene.

Figure 3:
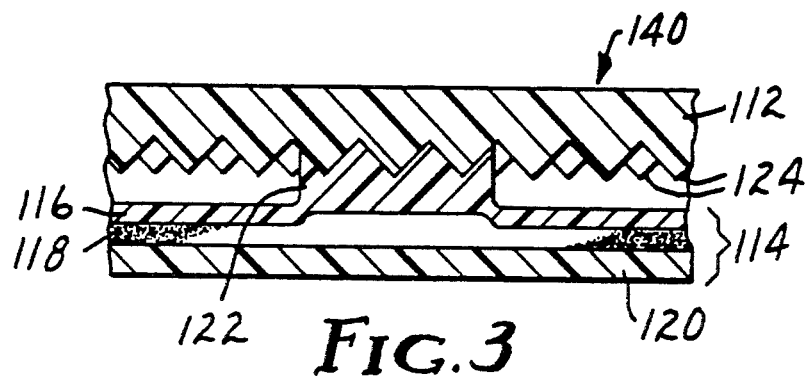
FIG. 3 is a cross-sectional illustration of a completed portion of one cube-corner embodiment of retroreflective sheeting of the invention.
Figure 4:
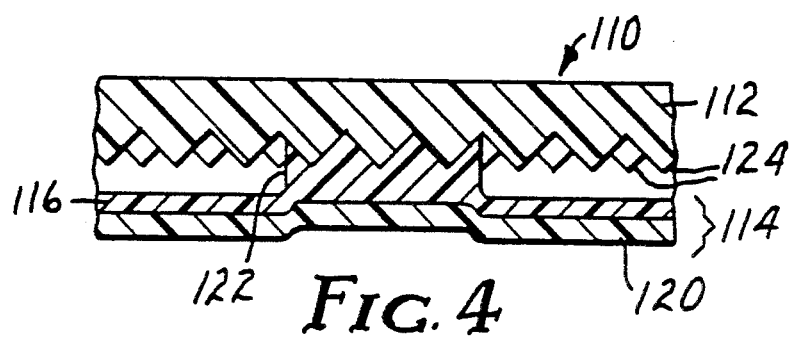
FIG. 4 is a cross-sectional illustration of a completed portion of another cube-corner embodiment of retroreflective sheeting of the invention.

FIGS. 3 and 4 illustrate embodiments of the invention in the form of prismatic or cube-corner type retroreflective sheetings. In FIG. 3 is shown portion 140 of the retroreflective sheeting which comprises face member 112 and encapsulating member 114. On the rear surface of face member 112 are a plurality of retroreflective elements 124 which in this embodiment are cube-corner retroreflective elements such as are disclosed in the aforementioned U.S. Pat. No. 4,025,159 and elsewhere. Portions of binder layer 116 of encapsulating member 114 are conformed into contact with face member 112 in a network of interconnecting bonds 122 which divide sheeting 110 into a number of sealed cells. Encapsulating member 114 further comprises barrier layer 120 adhered with intermediate adhesive 118.

FIG. 4 illustrates portion 110 of another embodiment similar to that shown in FIG. 3 except barrier 120 is self-adhered directly to binder layer 116 of encapsulating member 114 without use of an intermediate adhesive layer.

Figure 5:
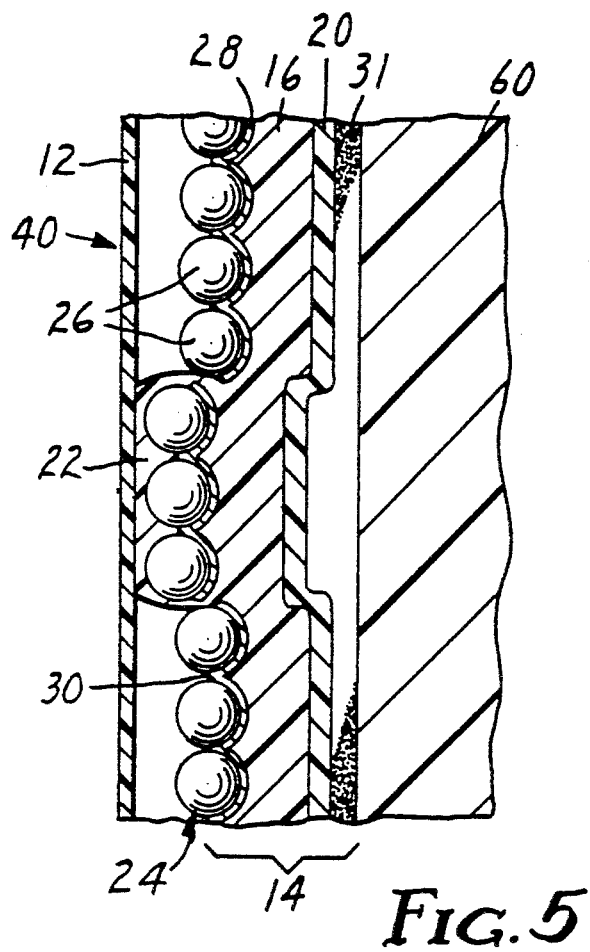
FIG. 5 is a cross-sectional illustration of a portion of a traffic cone to which a retroreflective sheeting of the invention is adhered.

A portion of a traffic cone 60 having sheeting 40 of the invention applied thereto is shown in FIG. 5. Commonly, cone 60 will be made of a sheet of highly plasticized polyvinyl chloride. Typically the cone will also contain a fluorescent pigment or dye.

In addition to providing protection to the sheeting from deleterious agents such as plasticizers in the substrate to which the sheeting is applied, barrier layers as taught herein can make sheetings incorporating same more tear resistant and impart greater tensile strength thereto. Accordingly, when sewn to a substrate, e.g., an article of clothing or panel on a flotation life vest, such sheetings will be less likely to rip or tear along the seam where the sheeting was perforated during sewing. Furthermore, the higher tensile strength of such sheetings can facilitate making them more easily or conveniently removable from a substrate. For instance, a fighter pilot's helmet may be issued with a sheeting of the invention adhered thereto to improve his detectability in the event of a crash; however, if the pilot is downed in an area where he wishes to remain undetected, the retroreflective sheeting can be removed from his helmet. Even when bonded with removable adhesives, many conventional retroreflective sheetings may tend to tear or shred into pieces when removal is attempted because they do not exhibit sufficient tensile strength.

Figure 6:
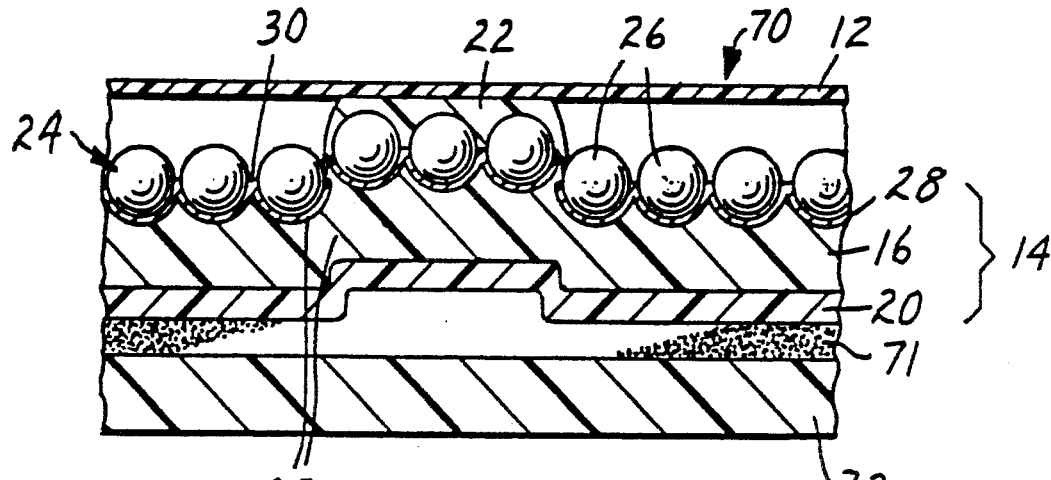
FIG. 6 is a cross-sectional illustration of a portion of another embodiment of retroreflective sheeting of the invention.

FIG. 6 shows another embodiment 70 of sheeting of the invention comprising face member 12, retroreflective elements 24, encapsulating member 14, and adhesive 71 which is used to adhere plasticizer-tolerant or plasticizer-resistant reinforcing member 72 thereto. Barrier layer 20 was used as the sealing film. Illustrative examples of reinforcing members include polymeric films such as nylon, polyester, etc. which may be utilized to impart greater strength to the sheeting, and which may also impart improved plasticizer resistance thereto. Other illustrative examples include various fabrics. If adhesive 71 is utilized with plasticizer-tolerant reinforcing member 72, it should also be plasticizer-tolerant; however, if reinforcing member 72 is plasticizer-resistant, i.e., blocks migration thereof, adhesive 71 typically need not be plasticizer-tolerant. In some instances (not shown), reinforcing members may self-adhere to the backside of the encapsulating member, such as by coextrusion or with corona treatment, without the use of an intermediate adhesive.

EXAMPLES

The invention will be further explained by the following illustrative examples which are intended to be nonlimiting. Unless otherwise indicated, all amounts are expressed in parts by weight.

Unless otherwise indicated, the following test methods were used herein.

Plasticizer Resistance

The resistance of a retroreflective sheeting to penetration by the plasticizer in a substrate was evaluated by measuring the retroreflective brightness of the subject sheeting, applying a sample of the subject sheeting to the surface of a plasticized substrate, e.g., a piece of polyvinyl chloride cut from a traffic cone, and allowing the assembly to dwell in an oven at 150° F. (65° C.) for 10 days. After dwell, the assembly was removed from the oven and allowed to cool to room temperature. The sample was inspected visually for any change, e.g., wrinkling, discoloration, tendency for cover film to delaminate, detectable (visually or to touch) surface residue, etc. and its retroreflective brightness again measured. Any change was noted, and the percentage of retroreflective brightness retained determined as a measure of the plasticizer resistance of the subject sheeting.

Retroreflective Brightness

Retroreflective brightness was measured using a retroluminometer as described in U.S. defensive publication T987,003 at a divergence angle of about 0.2° and at an entrance angle of about −4°.

Impact Resistance

Impact resistance was determined in accordance with the test procedure provided in Section 633.06(i) of the U.S. Department of Transportation Federal Highway Administration FP-79 Standard Specifications for Construction of Roads and Bridges on Federal Highway Projects except that the sample was stabilized at a temperature of 32° F. (0° C.) or at −10° F. (−23° C.) as indicated. The sample is considered resistant to the subject impact if it does not shatter or crack during when the weight is dropped. The impact resistance value is determined as the product of the weight times the vertical distance of the fall.

Flexibility

Flexibility of sample sheetings was determined in accordance with the test procedure provided in Section 633.06 (g) of the U.S. Department of Transportation Federal Highway Administration FP-79 Standard Specifications for Construction of Roads and Bridges on Federal Highway Projects except that the sample was stabilized at a temperature of 32° F. (0° C.) or at −10° F. (−23° C.) as indicated.

Example 1 And Comparative Example A

A polyethylene-coated paper carrier was heated to about 105° C. and then flooded with glass microspheres having an average diameter of about 65 microns and a refractive index of about 1.91. The excess microspheres were removed from the surface of the carrier yielding substantially a monolayer of microspheres thereon, and the carrier and monolayer then heated to about 140° C. to soften the polyethylene coating such that the microspheres were partially embedded therein by gravity and capillary forces in accordance with standard techniques. The carrier and monolayer were then put into a vacuum chamber and a layer of aluminum deposited thereon to a thickness of about 100 nanometers.

A solvent-borne urethane/vinyl system binder material comprising 18.0 parts aromatic urethanes, 6.0 parts vinyl, 8.0 parts titanium dioxide, 0.5 part FERRO 554 (vinyl stabilizer from Ferro Corp.), 0.5 part UVINOL N35 (vinyl stabilizer from BASF), 0.5 part stearic acid, and 66.5 parts solvents was coated over the aluminum-coated microspheres and the assembly dried in an oven to remove the solvents, forming the binder layer. The exposed surface of binder material was corona treated and one surface of a biaxially-oriented 0.5 mil polyethylene terephthalate film was also corona treated, and then the film was hot laminated to the binder material with the corona treated surfaces in contact with one another. The carrier was then stripped off to expose the front surfaces of the microspheres.

A transparent film comprising 97.4 parts of PRIMACOR 3440 (an extrusion grade, thermoplastic, high molecular weight copolymer believed to comprise a major portion of ethylene monomer and a minor portion of acrylic acid monomer, available from Dow Chemical Co., having a melt flow index of about 10), and 2.6 parts of a weather stabilizing system (1.0 part of ultraviolet absorber, 1.5 parts of a hindered amine, and 0.1 parts of an antioxidant; which is not believed to affect the strength of the film or its adhesion to other materials), was extruded as follows to form a structural layer. The stabilized copolymer was extruded from a 6.3 centimeter extruder through a 40.6 centimeter die onto a biaxially-oriented polyethylene terephthalate (PET) carrier using a single-flighted screw with a compression ratio of 3:1. The extruder temperatures were 190° C., 60° C., 273° C., 264° C., and 264° C. for zones 1 through 5, respectively. The extruder neck and die lips were at 70° C. The extruder screw speed was 30 rpm while the film take-away speed was adjusted to provide a film having a thickness of about 100 microns. The extruded film was then wound upon itself into roll form.

An inner layer was formed by corona treating one side of the PRIMACOR film and then bar coating at a gap setting of about 3 mils (75 microns) a solution of about 25 weight percent aliphatic urethane in toluene, n-propyl alcohol, propylene glycol monomethyl ether, and ethylenediamine thereto. The construction was then dried by heating to remove solvents, thus leaving a hard urethane inner layer which would provide a strong bond to the binder material.

The cover sheet was then contacted to the base sheet such that the inner layer was in contact with the microspheres protruding from the base sheet and sealed thereto along a network of interconnecting bonds in accordance with standard procedures. The polyester film which was to function as a barrier layer in accordance with the present invention thus also served as the sealing layer during the formation of the set of interconnecting bonds.

A "plasticizer-tolerant" adhesive, SCOTCH Joining Systems #927, an acrylic pressure-sensitive adhesive on liner, was then applied to the back side of the barrier layer and the liner removed. By "plasticizer-tolerant" it is meant that the adhesive will provide desirable adhesive performance, even after having been exposed to plasticizer and subjected to migration of plasticizer therethrough.

The carrier was then stripped from the front surface of the cover film.

In Comparative Example A, the sheeting was made in exactly the same manner except that neither the binder material nor the polyester film was corona treated prior to hot lamination, and the polyester film was removed after the interconnecting bonds were formed, i.e., it was used only as a sealing film. The plasticizer tolerant adhesive was applied directly to the back side of the encapsulating member, i.e., the binder layer, which did not possess a barrier layer in accordance with the present invention.

Testing of the two sheetings for plasticizer resistance yielded the following results.

| Example | Brightness[1] | |
|---|---|---|
| | Before | After |
| 1 | 300 | 300 |
| A | 320 | 20 |

[1]Candela per lux per meter[2]

To the unaided eye, the sample in Example 1 had substantially the same appearance both before and after the plasticizer resistance test, whereas the sample in Comparative Example A has become wrinkled and slightly discolored in its seal leg portions. Furthermore, some plasticizer had permeated completely through the sheeting and exuded from the front surface of the sheeting in Comparative Example A.

Example 2 And Comparative Example B

In Comparative Example B, a piece of REFLEXITE Brand Super High Intensity Grade Barricade Sheeting, a prismatic retroreflective sheeting comprising a face member believed to be made of polyester and an olefin encapsulating member believed to be made of polyethylene, was tested for plasticizer-resistance in accordance with the test described above. The encapsulating member had been sealed to the face member with a network of interconnecting bonds believed to have been formed with a polyolefin-based adhesive. An aluminum layer, possibly a vapor coat, had been applied to the portions of the back side of the face member where the bonds were adhered, making those portions of the sheeting gray in color.

In Example 2, a retroreflective sheeting of the invention was made by applying a 0.5 mil thick biaxially-oriented polyester film to the rear side of a piece of the same commercial sheeting as used in Comparative Example B, thus adding the polyester film to the encapsulating member in accordance with the present invention. A plasticizer-tolerant adhesive like that used in Example 1 was applied to the back, i.e., exposed side, of the polyester barrier layer and the sheeting then tested for plasticizer-resistance.

The following plasticizer-resistance results were obtained:

| Example | Brightness[1] | |
|---|---|---|
| | Before | After |
| 2 | 450 | 500 |
| B | 430 | 240 |

[1]Candela per lux per meter[2]

When observed with just the unaided eye, the sheeting of sample 2 was found to have substantially retained its original appearance, whereas the sample in Comparative Example B was found to have become wrinkled and discolored and to have become subject to easy delamination between the aluminum coating on the face member and the encapsulating member.

Prior to testing for plasticizer-resistance essentially the entire front surface of both sheetings were retroreflective. After such testing, the sample in Example 2 remained retroreflective over essentially its entire surface, but the sample in Comparative Example B was retroreflective over substantially only the portions of the face member which had the aluminum coating. The sample in Example 2 was found to have increased in retroreflective brightness by about 10 percent following the testing. Although the mechanism for this increase is unexplained, this phenomenon has been observed before with this commercial product.

Various modifications and alterations of this invention will become apparent to those skilled in the art without departing from the scope and spirit of this invention.

What is claimed is:

1. An encapsulated-lens retroreflective sheeting comprising: a) a substantially transparent face member; b) an encapsulating member having a front and a back side, said front side of said encapsulating member and said face member being sealed by a network of interconnecting bonds; and c) retroreflective elements disposed between said face member and said encapsulating member and arranged in substantially a monolayer with an air-interface; wherein said encapsulating member comprises a plasticizer-resistant barrier layer, said barrier layer comprising at least one of the following: polyester, nylon, polyvinylidene dichloride, ethylene vinyl alcohol, fluoropolymer, or metal film, and being substantially impermeable to monomeric plasticizers, and said sheeting is sufficiently flexible to be wrapped around a ⅛ inch mandrel at a temperature of about 0° C., and has an impact-resistance of at least 40 inch-pounds at 0° C.

2. The sheeting of claim 1 wherein said sheeting is sufficiently flexible to be wrapped around a ⅛ inch mandrel at a temperature of about −23° C.

3. The sheeting of claim 1 wherein said sheeting has sufficient impact resistance to withstand a 100 inch-pound impact at a temperature of about 0° C. without breaking.

4. The sheeting of claim 1 wherein said sheeting has sufficient impact resistance to withstand a 160 inch-pound impact at a temperature of about −23° C. without breaking.

5. The sheeting of claim 1 wherein said barrier layer comprises a polymeric film.

6. The sheeting of claim 1 wherein said barrier layer comprises a metal film and is between about 0.25 and about 3 mils thick.

7. The sheeting of claim 1 wherein said barrier layer is between about 0.25 and about 10 mils thick.

8. The sheeting of claim 1 wherein said barrier layer is between about 0.25 and about 1 mil thick.

9. The sheeting of claim 8 wherein said barrier layer comprises a biaxially-oriented polyethylene terephthalate film.

10. The sheeting of claim 1 wherein said barrier layer is between about 2 and about 4 mils thick.

11. The sheeting of claim 1 wherein said barrier layer comprises an extruded film.

12. The sheeting of claim 1 wherein said barrier layer was used as a sealing film during the formation of said network of interconnecting bonds.

13. The sheeting of claim 12 wherein said barrier layer comprises a biaxially-oriented polyethylene terphthalate film.

14. The sheeting of claim 1 wherein said face member is multilayer.

15. The sheeting of claim 1 wherein said face member comprises at least one of the following: protective agents, colorants, and adhesion promoters.

16. The sheeting of claim 1 wherein said encapsulating member comprises at least one of the following: coloring agent, protective agent, adhesion promoter, and processing aid.

17. The sheeting of claim 1 wherein said encapsulating member comprises a layer of binder material on the front side thereof and said retroreflective elements are partially embedded in and protrude from said front side thereof.

18. The sheeting of claim 17 wherein said binder layer comprises a substantially thermoplastic material.

19. The sheeting of claim 17 wherein said binder layer comprises at least one of the following: urethanes, vinyls, and olefins.

20. The sheeting of claim 17 wherein said binder layer comprises a curable material.

21. The sheeting of claim 17 wherein said retroreflective elements are glass microspheres having reflectors disposed behind the rear surfaces thereof.

22. The sheeting of claim 21 wherein said microspheres have an average diameter are between about 40 and about 200 microns.

23. The sheeting of claim 1 wherein said retroreflective elements are prismatic reflectors and are disposed on the back side of said face member.

24. The sheeting of claim 1 further comprising a mounting adhesive on the back side of said encapsulating member.

25. The sheeting of claim 24 wherein said adhesive comprises a plasticizer-tolerant adhesive.

26. The sheeting of claim 1 wherein said sheeting is adhered to a plasticized substrate.

27. The sheeting of claim 1 further comprising a plasticizer-tolerant reinforcing member adhered to the back side of said encapsulating member.

28. The sheeting of claim 1 which is adhered to a traffic cone.

29. The sheeting of claim 1 wherein said barrier layer is substantially impermeable to dioctyl phthalate and dioctyl terephthalate.

30. An encapsulated-element retroreflective sheeting comprising: a) a substantially transparent face member; b) an encapsulating member having a front and a back side, said front side of said encapsulating member and said face member being sealed by a network of interconnecting bonds; and c) retroreflective elements disposed on the back side of said face member and arranged in substantially a monolayer with an air-interface;

wherein said encapsulating member comprises a plasticizer-resistant barrier layer comprising at least one of the following: polyester, nylon, polyvinylidene dichloride, ethylene vinyl alcohol, fluoropolymer, or metal film, said barrier layer being substantially impermeable to monomeric plasticizers.

31. An encapsulated-element retroreflective sheeting comprising: a) a substantially transparent face member; b) an encapsulating member having a front and a back side, said front side of said encapsulating member and said face member being sealed by a network of interconnecting bonds; and c) retroreflective elements disposed between said face member and said encapsulating member and arranged in substantially a monolayer with an air-interface;

wherein said encapsulating member comprises a plasticizer-resistant barrier layer and a layer of binder material in which said retroreflective elements are partially embedded, said sheeting is sufficiently flexible to wrapped around a ⅛ inch mandrel at a temperature of about 0° C. and has an impact-resistance of at least 40 inch-pounds at 0° C., said barrier layer and said layer of binder material are self-adhered directly together, said barrier layer comprising at least one of the following: polyester, nylon, polyvinylidene dichloride, ethylene vinyl alcohol, fluoropolymer, or metal film, said barrier layer being substantially impermeable to monomeric plasticizers.

* * * * *

UNITED STATES PATENT AND TRADEMARK OFFICE
CERTIFICATE OF CORRECTION

PATENT NO. : 5,069,964
DATED : December 3, 1991
INVENTOR(S) : Howard R. Tolliver et al.

It is certified that error appears in the above-identified patent and that said Letters Patent is hereby corrected as shown below:

In Column 5, Line 68, insert a period after the word "coatings".

In Column 9, Line 29, insert a period after the word "rollers".

In Column 13, Line 28, "60°C" should read --260°C--.

In Column 13, Line 30, "70°C" should read --270°C--.

Signed and Sealed this

Twentieth Day of April, 1993

Attest:

MICHAEL K. KIRK

*Attesting Officer*　　*Acting Commissioner of Patents and Trademarks*